US008170827B2

(12) United States Patent
Kim et al.

(10) Patent No.: US 8,170,827 B2
(45) Date of Patent: May 1, 2012

(54) DROP MASS DEVIATION MEASURING APPARATUS, DROP MASS DEVIATION MEASURING METHOD OF THE SAME, PATTERN FORMING SYSTEM USING THE SAME, AND CONTROL METHOD OF THE PATTERN FORMING SYSTEM USING THE SAME

(75) Inventors: Chong Uck Kim, Suwon-si (KR); Hyuk Kim, Seongnam-si (KR); Sano Jin Choi, Yongin-si (KR); Seong Wook Cheong, Seongnam-si (KR); Eun Seon Lim, Hwaseong-si (KR); Byung Il Ahn, Seoul (KR); Joong He Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 903 days.

(21) Appl. No.: 12/222,602

(22) Filed: Aug. 12, 2008

(65) Prior Publication Data

US 2009/0164169 A1 Jun. 25, 2009

(30) Foreign Application Priority Data

Dec. 24, 2007 (KR) ........................ 10-2007-0136629

(51) Int. Cl.
*G01G 19/00* (2006.01)

(52) U.S. Cl. ........ 702/100; 702/101; 702/150; 702/151; 702/155; 702/156; 702/166; 702/170; 347/15; 347/19; 358/1.2; 358/1.9

(58) Field of Classification Search .................. 702/100, 702/101, 150, 151, 155, 156, 166, 170; 347/15, 347/19; 358/1.2, 1.9
See application file for complete search history.

(56) References Cited

U.S. PATENT DOCUMENTS

| | | | | |
|---|---|---|---|---|
| 3,938,163 | A * | 2/1976 | Fujimoto et al. | 347/77 |
| 6,911,132 | B2 | 6/2005 | Pamula et al. | |
| 2007/0070107 | A1 | 3/2007 | Shamoun et al. | |

* cited by examiner

*Primary Examiner* — Sujoy Kundu
(74) *Attorney, Agent, or Firm* — Staas & Halsey LLP

(57) ABSTRACT

A drop mass deviation measuring apparatus, a drop mass deviation measuring method, a pattern forming system, and a control method measure mass deviations of drops discharged from a plurality of drop discharge units in real time with high precision. The apparatus utilizes a plurality of drops discharged from a plurality of drop discharge units, a drop moving force providing part to provide moving forces, having directions different from discharge directions of each of the plurality of drops, to the plurality of drops, a discharged drop position detection member to acquire drop position images individually reflecting the a position of each of the plurality of drops, and a drop mass deviation measurement control part to calculate a drop discharge direction separation angle of each of the plurality of drops using the drop position images acquired by the discharged drop position detection member to measure mass deviation of each of the drops.

8 Claims, 7 Drawing Sheets

DROP MASS DEVIATION MEASURING APPARATUS, DROP MASS DEVIATION MEASURING METHOD OF THE SAME, PATTERN FORMING SYSTEM USING THE SAME, AND CONTROL METHOD OF THE PATTERN FORMING SYSTEM USING THE SAME

CROSS-REFERENCE TO RELATED APPLICATIONS

This application claims the benefit of Korean Patent Application No. 2007-136629, filed on Dec. 24, 2007 in the Korean Intellectual Property Office, the disclosure of which is incorporated herein by reference.

BACKGROUND

1. Field

The present invention relates to a drop mass deviation measuring apparatus, a drop mass deviation measuring method of the same, a pattern forming system using the same, and a control method of the pattern forming system using the same, and, more particularly, to a drop mass deviation measuring apparatus that is capable of measuring the mass deviations of drops discharged from a plurality of drop discharge units in real time and measuring the mass deviations of the drops discharged from the drop discharge units even when the drops have diameters requiring high precision, a drop mass deviation measuring method of the same, a pattern forming system using the same, and a control method of the pattern forming system using the same.

2. Description of the Related Art

A method and apparatus for forming a pattern of a semiconductor circuit or a color filter of a liquid crystal display device leading a display industry generally uses photolithography.

Photolithography includes several operations, such as application, exposure, and development of a process material. Consequently, the photolithography is complicated and needs a long process time. Also, costs required to use a photoresist and a photo mask are high.

In recent years, there have been proposed an inkjet method substituting the photolithography having the above-mentioned drawbacks and a pattern forming system using the inkjet method. The inkjet method and the pattern forming system using the inkjet method form a pattern of a color filter of a liquid crystal display device or a semiconductor circuit.

When the masses of drops discharged from a plurality of drop discharge units are different from one another due to electrical and mechanical causes, however, the pattern of the semiconductor circuit or the pattern of the color filter of the liquid crystal display device may be formed nonuniformly. For this reason, there is a need for an apparatus or method to measure the mass deviation of drops discharged from the drop discharge units to prevent the occurrence of the mass deviation of the drops.

In response to the need, an impact drop analysis method and a drop photograph analysis method may be proposed as the method for measuring the mass deviation of the drops discharged from the drop discharge units.

In the impact drop analysis method, a drop is impacted to an object, such as paper, and the drop impacted on the object is analyzed to measure the mass deviation of drops discharged from a plurality of drop discharge units. In the drop photograph analysis method, the diameters of drops discharged from a plurality of drop discharge units are measured using drop images obtained by passing the drops between a lighting device and a vision camera to measure the mass deviation of the drops.

In the impact drop analysis method, a drop is impacted on an object, and the object on which the drop is impacted is analyzed to measure the mass deviation of the drop. For this reason, it is not easy to acquire the mass deviations of drops discharged from a plurality of drop discharge units in real time using the impact drop analysis method. Consequently, the impact drop analysis method is limited to be applied to a process for forming a pattern of a semiconductor circuit or a pattern of a color filter of a liquid crystal display device. Furthermore, the drop impacted on the object may be absorbed and evaporated, with the result that an error may occur in analyzing the drop impacted on the object.

In the drop photograph analysis method, the diameters of drops discharged from a plurality of drop discharge units are directly measured from the photographed drop images to measure the mass deviations of the drops. Consequently, when the diameters of the drops require high precision, an error may occur in measuring the diameters of the drops.

In addition, a pattern forming system using the impact drop analysis method or drop photograph analysis method and a control method of the pattern forming system have drawbacks in that the time necessary to form a pattern increases, and the system is limited to forming a pattern requiring high precision.

SUMMARY

Therefore, it is an aspect of the invention to provide a drop mass deviation measuring apparatus that is capable of measuring the mass deviations of drops discharged from a plurality of drop discharge units in real time and measuring the mass deviations of the drops discharged from the drop discharge units even when the drops have diameters requiring high precision, and a drop mass deviation measuring method of the same.

It is another aspect of the invention to provide a pattern forming system, using a drop mass deviation measuring apparatus that is capable of measuring the mass deviations of drops discharged from a plurality of drop discharge units in real time and measuring the mass deviations of the drops discharged from the drop discharge units even when the drops have diameters requiring high precision, to reduce process time necessary to form a pattern and form a pattern requiring high precision, and a control method of the pattern forming system.

In accordance with one aspect, the present invention provides a drop mass deviation measuring apparatus including a plurality of drops discharged from a plurality of drop discharge units, a drop moving force providing part to provide moving forces, having directions different from the discharge directions of the drops, to the drops, a discharged drop position detection member to acquire drop position images individually reflecting the positions of the drops, and a drop mass deviation measurement control part to calculate drop discharge direction separation angles of the drops using the drop position images acquired by the discharged drop position detection member to measure the mass deviations of the drops.

Generally, the drop moving force providing part uses a Coulomb's force.

In general, the drop moving force providing part includes an anode plate and a cathode plate, the drops being located between the anode plate and the cathode plate.

Generally, the drop mass deviation measurement control part sets angles between the moving directions in which the discharge points of the drops and the positions of the drops are linked to each other at the drop position images and the discharge directions of the drops which are drop discharge direction separation angles of the drops.

In general, the drop mass deviation measurement control part subtracts the mean of the discharge direction separation angles of the drops from the discharge direction separation angles of the drops to acquire the discharge direction separation angle deviations of the drops and multiplies the discharge direction separation angle deviations of the drops by a predetermined negative number to acquire the mass deviations of the drops.

In accordance with another aspect, the present invention provides a drop mass deviation measuring method of a drop mass deviation measuring apparatus, including acquiring drop position images individually reflecting the positions of a plurality of drops sequentially discharged from a plurality of drop discharge units, calculating the moving directions of the drops using the drop position images, calculating the drop discharge direction separation angles of the drops, which are angles between the moving directions and the discharge directions of the drops, and calculating the mass deviations of the drops using the drop discharge direction separation angles of the drops.

Generally, the moving directions of the drops are directions in which the discharge points of the drops and the positions of the drops are linked to each other at the drop position images.

In general, the operation of calculating the mass deviations of the drops includes subtracting the mean of the discharge direction separation angles of the drops from the discharge direction separation angles of the drops to acquire the discharge direction separation angle deviations of the drops and multiplying the discharge direction separation angle deviations of the drops by a predetermined negative number to acquire the mass deviations of the drops.

In accordance with another aspect, the present invention provides a pattern forming system using a drop mass deviation measuring apparatus, including a plurality of drops discharged from a plurality of drop discharge units, a drop moving force providing part to provide moving forces, having directions different from the discharge directions of the drops, to the drops, a discharged drop position detection member to acquire drop position images individually reflecting the positions of the drops, a drop mass deviation measurement control part to calculate drop discharge direction separation angles of the drops using the drop position images acquired by the discharged drop position detection member to measure the mass deviations of the drops, and a controller to control the masses of the drops discharged from the drop discharge units to be uniform using the mass deviations of the drops measured by the drop mass deviation measurement control part.

In accordance with a further aspect, the present invention provides a control method of a pattern forming system using a drop mass deviation measuring apparatus, including acquiring drop position images individually reflecting the positions of a plurality of drops sequentially discharged from a plurality of drop discharge units, calculating the moving directions of the drops using the drop position images, calculating the drop discharge direction separation angles of the drops, which are angles between the moving directions and the discharge directions of the drops, calculating the mass deviations of the drops using the drop discharge direction separation angles of the drops, and controlling the masses of the drops discharged from the drop discharge units to be uniform using the mass deviations of the drops.

Generally, the operation of controlling the masses of the drops includes selecting drop discharge units that discharge drops having negative mass deviations from the drop discharge units, controlling the drops discharged from the selected drop discharge units to have masses increased in proportion to the sizes of the negative mass deviations, selecting drop discharge units that discharge drops having positive mass deviations from the drop discharge units, and controlling the drops discharged from the selected drop discharge units to have masses decreased in proportion to the sizes of the positive mass deviations.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF EMBODIMENTS

Figure 1:
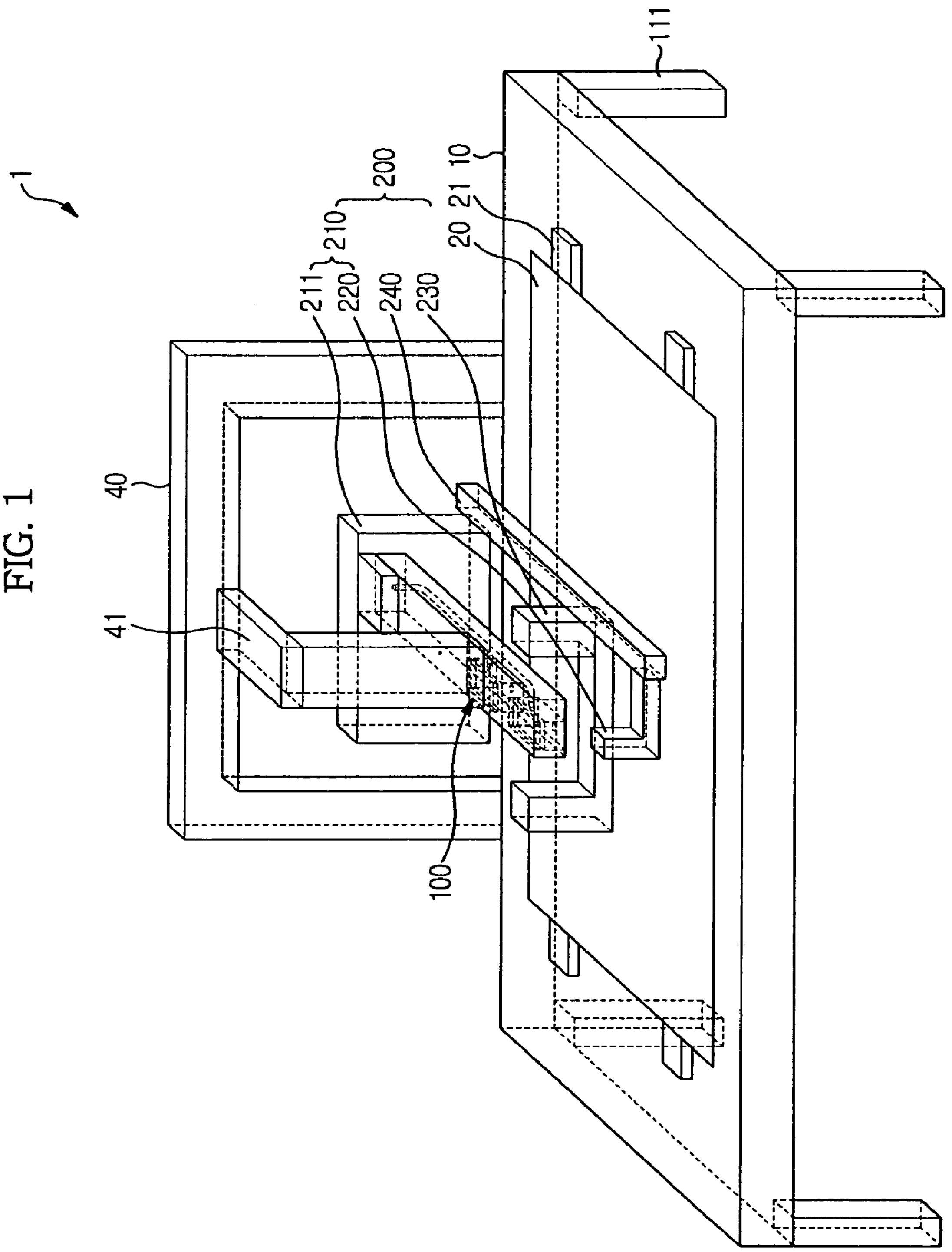
FIG. 1 is a perspective view schematically illustrating a pattern forming system using a drop mass deviation measuring apparatus according to an embodiment of the present invention.
Figure 2:
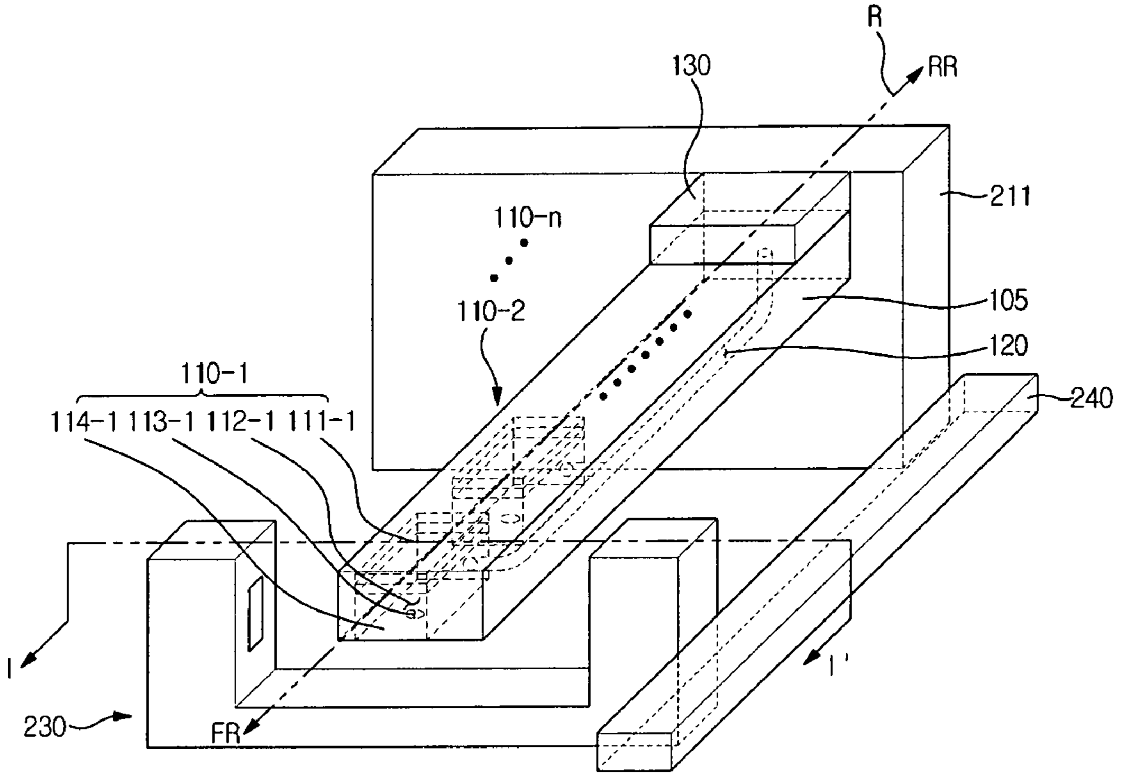
FIG. 2 is a perspective view schematically illustrating drop mass deviation measuring apparatus according to an embodiment of the present invention.
Figure 3:
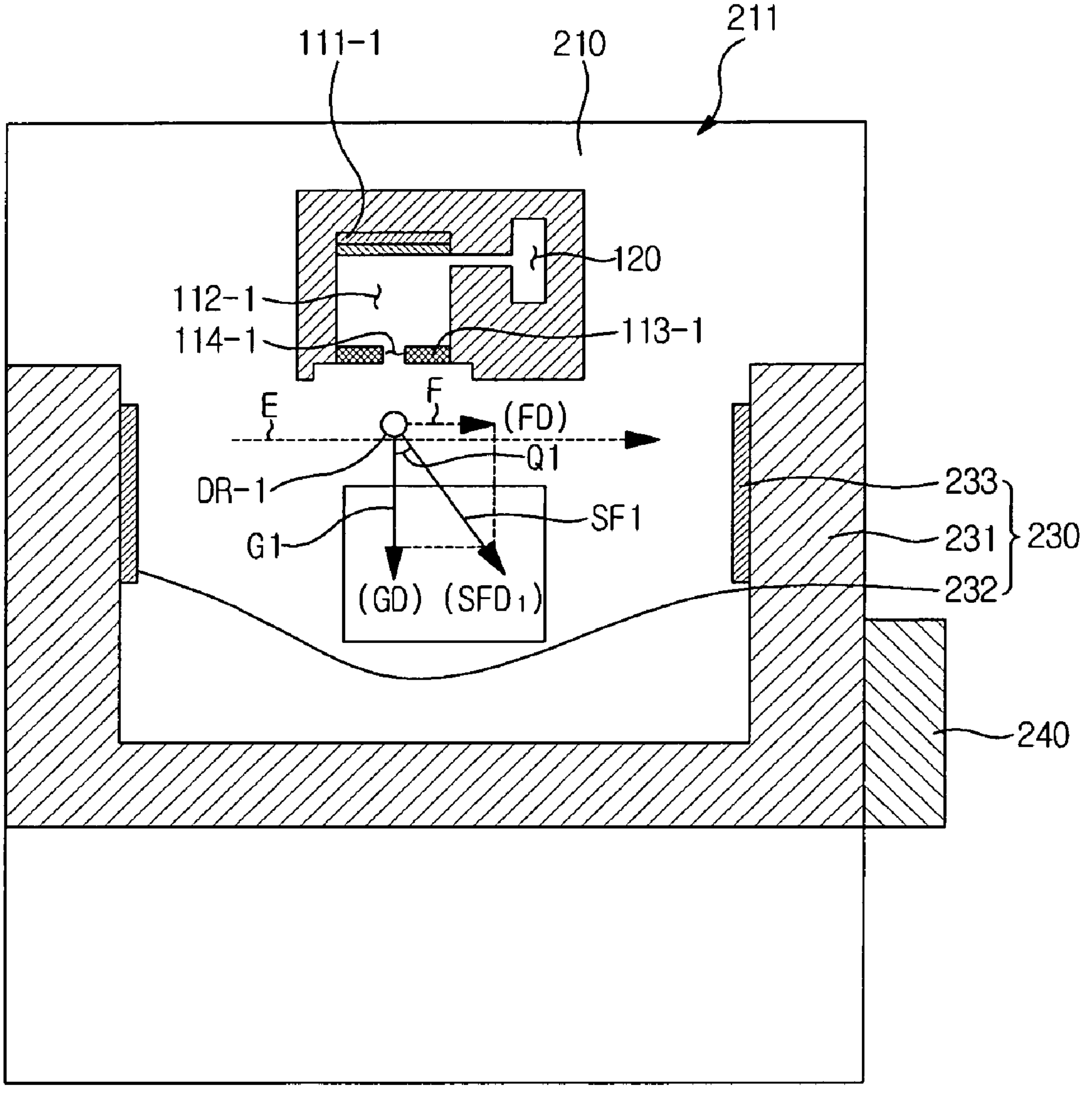
FIG. 3 is a sectional view taken along line I-I' of FIG. 2.
Figure 4:
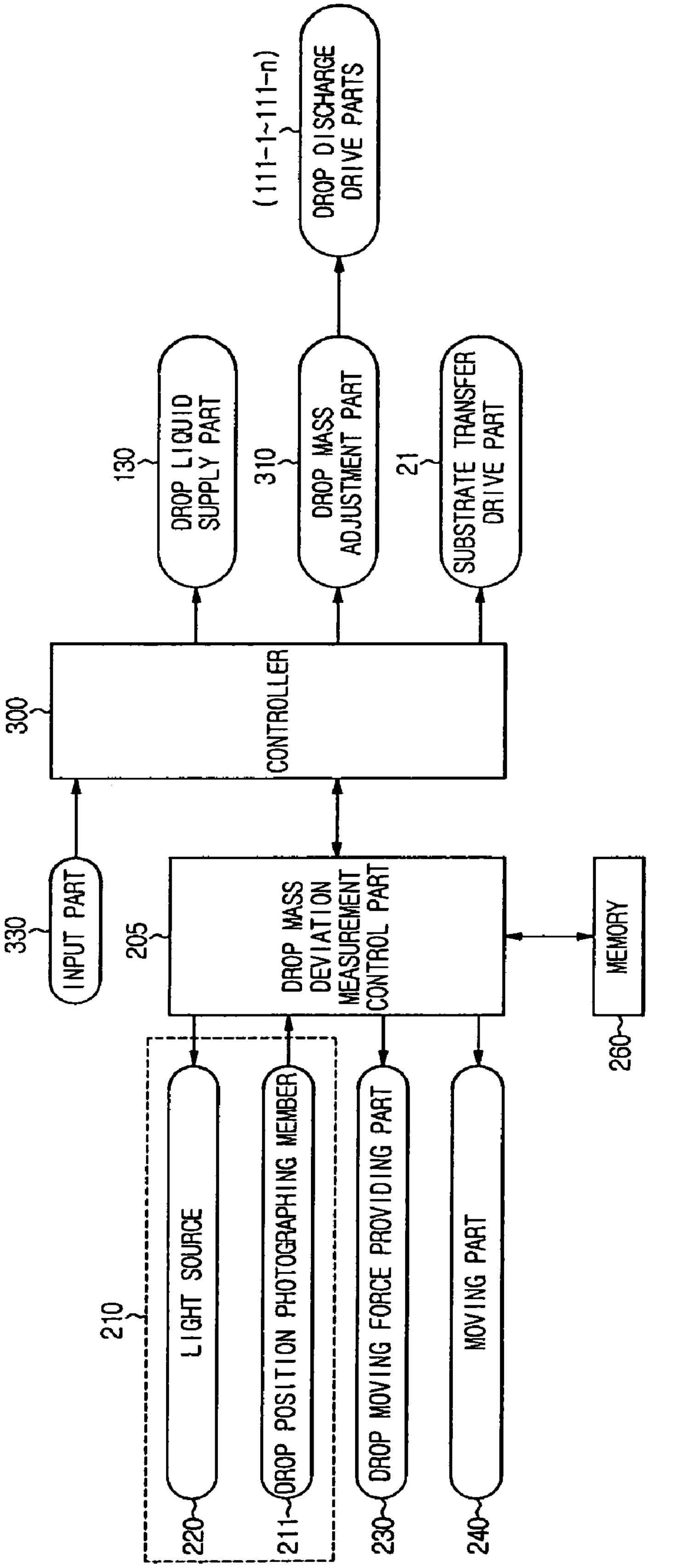
FIG. 4 is a control block diagram of the pattern forming system according to the present invention.

Reference will now be made in detail to the embodiment of the present invention, examples of which are illustrated in the accompanying drawings, wherein like reference numerals refer to like elements throughout. The embodiment is described below to explain the present invention by referring to the figures.

Referring to FIGS. 1 to 4, a pattern forming system 1 using a drop mass deviation measuring apparatus according to an embodiment of the present invention (hereinafter, simply referred to as a 'pattern forming system') includes a stage 10 supported by support parts 11, a substrate transfer part 20 mounted above the stage 10 such that the substrate transfer part 20 is movable while a substrate is located on the substrate transfer part 20, a gate structure 40 to support a drop discharging apparatus 100 which discharges drops toward the substrate, and a controller 300 to control the overall operations of a drop mass deviation measuring apparatus 200 to measure the mass deviation of drops discharged from the drop discharging apparatus 100 and the pattern forming system 1.

The substrate transfer part 20 is moved by a substrate transfer drive part 21, which is controlled by the controller 300.

The drop discharging apparatus 100 includes a drop discharge head 105 having a plurality of drop discharge units 110-1 to **110-*n* arranged in line, and a drop liquid supply part 130 to supply a drop liquid to the drop discharge units 110-1 to 110-*n***.

The liquid supply part 130 supplies the drop liquid to drop liquid chambers 112-1 to **112-*n*, which will be described below, through a drop liquid supply channel 120 connected to the respective drop discharge units 110-1 to 110-*n***.

The drop discharge units 110-1 to **110-*n* includes the drop liquid chambers 112-1 to 112-*n* formed in the drop discharge head 105, nozzle plates 113-1 to 113-*n* to form nozzles 114-1 to 114-*n*, such that drops DR-1 to DR-n can be discharged toward the wafer through the nozzles 114-1 to 114-*n*, and to close the drop liquid chambers 112-1 to 112-*n* below the drop liquid chambers 112-1 to 112-*n*, and drop discharge drive parts 111-1 to 111-*n* mounted above the drop liquid chambers 112-1 to 112-*n* to press the drop liquid chambers 112-1 to 112-*n***.

The drop discharge drive parts 111-1 to **111-*n* are materialized by a piezoelectric element which is bendable when energized. The bending degree of the drop discharge drive parts 111-1 to 111-*n* is proportional to the voltage applied to the drop discharge drive parts 111-1 to 111-*n*. Consequently, the pressure of the drop liquid chambers 112-1 to 112-*n* is adjusted by adjusting the voltage applied to the drop discharge drive parts 111-1 to 111-*n*, whereby the volume and mass of drops discharged through the nozzles 114-1 to 114-*n*** are adjusted.

The drop mass deviation measuring apparatus 200 includes a discharged drop position detection member 210 to detect the position of a drop DR-1 discharged from any one of the drop discharge units 110-1 to **110-*n*, a drop moving force providing part 230 to provide a moving force to the drop DR-1 discharged from any one of the drop discharge units 110-1 to 110-*n*, a moving part 240 to move the drop moving force providing part 230 to positions corresponding to the respective drop discharge units 110-1 to 110-*n* such that the a drop moving force providing part 230 can sequentially provide moving forces to drops discharged from the respective drop discharge units 110-1 to 110-*n*, and a drop mass deviation measurement control part 205 to control the overall operation of the drop mass deviation measuring apparatus 200**.

The drop moving force providing part 230 includes an anode plate 232 disposed at one side of a drop DR-1 discharged from any one of the drop discharge units 110-1 to **110-*n* to provide a Coulomb's force to the drop DR-1 discharged from any one of the drop discharge units 110-1 to 110-*n*, a cathode plate 233 disposed at the other side of the drop DR-1 discharged from any one of the drop discharge units 110-1 to 110-*n*, and an electrode support member 231 to support the anode plate 232 and the cathode plate 233**.

The drop moving force providing part 230 provides a moving force to a drop DR-1 discharged from any one of the drop discharge units 110-1 to **110-*n* at a long distance. In other words, when power is supplied to the anode plate 232 and the cathode plate 233, an electric field E is created between the anode plate 232 and the cathode plate 233, and a moving force F due to the electric field E is applied to a drop DR-1 discharged from any one, which is charged, of the drop discharge units 110-1 to 110-*n*. For example, a drop DR-1 discharged from any one of the drop discharge units 110-1 to 110-*n* exhibits a positive charge, a repulsive force is generated between the drop DR-1 discharged from any one of the drop discharge units 110-1 to 110-*n* and the anode plate 232, and an attractive force is generated between the drop DR-1 discharged from any one of the drop discharge units 110-1 to 110-*n* and the cathode plate 233. As a result, a moving force F is applied to the drop DR-1 such that the drop DR-1 is urged toward the cathode plate 233**.

The accuracy in measuring the discharge direction separation angle of the drop DR-1, the anode plate 232 and the cathode plate 233 are arranged such that the moving force application direction FD is perpendicular to the drop discharge direction GD.

Here, the drop moving force providing part 230 is not limited to provide the Coulomb's force. For example, the drop moving force providing part 230 may provide an impact force to a drop DR-1 discharged from any one of the drop discharge units 110-1 to **110-*n*. In other words, an air nozzle may be mounted at the position where the anode plate 232 or the cathode plate 233 of the drop moving force providing part 230** is disposed such that a kinetic force of air sprayed through the air nozzle is transmitted to the drop. At this time, the kinetic force of air is a moving force F applied to the drop.

Meanwhile, the moving direction SFD1 of a drop DR-1 discharged from any one of the drop discharge units 110-1 to **110-*n*, to which a moving force is applied by the drop moving force providing part 230, is separated from the drop discharge direction GD by the drop discharge direction separation angle Q1 having a size inversely proportional to the mass of the drop DR-1**.

In other words, a drop DR-1 discharged from any one of the drop discharge units 110-1 to **110-*n* receives a sum force SF1, which is the sum of a gravity G1 having a size proportional to the mass in the gravity direction and a moving force F having a fixed size. Consequently, the direction SFD1 of the sum force SF1 approaches the gravity direction GD with the increase in size of the gravity G1, with the result that the drop discharge direction separation angle Q1 between the gravity direction GD and the sum force direction SFD1 decreases. Also, the direction SFD1 of the sum force SF1 increases from the gravity direction GD with the decrease in the size of the gravity G1, with the result that the drop discharge direction separation angle Q1 between the gravity direction GD and the sum force direction SFD1 increases. Consequently, the moving direction SFD1 of a drop DR-1 discharged from any one of the drop discharge units 110-1 to 110-*n*, to which a moving force F is applied by the drop moving force providing part 230, is separated from the discharge direction GD of the drop DR-1 by the drop discharge direction separation angle Q1 having a size inversely proportional to the mass of the drop DR-1**.

The discharged drop position detection member 210 includes a drop position photographing member 211 mounted at the rear RR of a row R of the drop discharge units 110-1 to **110-*n*, the drop position photographing member 211 being materialized by a well-known CCD camera, and a light source 220 disposed opposite to the drop position photographing member 211**.

The light source 220 emits light to the drop position photographing member 211 such that the respective positions of drops discharged from the drop discharge units 110-1 to **110-*n*, photographed by the drop position photographing member 211**, are clearly reflected.

When the light source 220 emits light, and a drop DR-1 is discharged from the drop discharge unit 110-1, the drop position photographing member 211 acquires a drop position image reflecting the position of the drop DR-1 and transmits the acquired image to the drop mass deviation measurement control part 205.

The moving part 240 sequentially moves the drop moving force providing part 230 to positions corresponding to the respective drop discharge units 110-1 to **110-*n* such that the drop moving force providing part 230 can provide a moving force F to drops discharged from the respective drop discharge units 110-1 to 110-*n*.**

An input part 330 is provided at the input side of the controller 300. The drop liquid supply part 130, a drop mass adjustment part 310 to individually drive the drop discharge drive parts 111-1 to **111-*n*, and the substrate transfer drive part 21 are provided at the output side of the controller 300. The controller 300 is connected to the drop mass deviation measurement control part 205 in a communicating fashion. The drop position photographing member 211 is provided at the input side of the drop mass deviation measurement control part 205. The light source 220, the drop moving force providing part 230, and moving part 240 are provided at the output side of the drop mass deviation measurement control part 205. The drop mass deviation measurement control part 205 further includes a memory 260 to store drop position images FV1 to FVn individually reflecting the positions of drops discharged from the respective drop discharge units 110-1 to 110-*n*.**

The drop mass deviation measurement control part 205 calculates the moving directions SFD1 to SFDn (see FIG. 7) of drops DR-1 to DR-n using the drop position images FV1 to FVn individually reflecting the positions of drops discharged from the respective drop discharge units 110-1 to **110-*n*, calculates the discharge direction separation angles Q1 to Qn of the drops DR-1 to DR-n, which are angles between the moving directions SFD1 to SFDn and the discharge directions of the drops DR-1 to DR-n (see FIG. 7), and subtracts the mean of the discharge direction separation angles Q1 to Qn of the drops DR-1 to DR-n from the discharge direction separation angles Q1 to Qn of the drops DR-1 to DR-n, to acquire the discharge direction separation angle deviations of the drops. Subsequently, the discharge direction separation angle deviations of the drops DR-1** to DR-n are multiplied by a predetermined negative number to acquire the mass deviations of the drops.

The controller 300 controls the masses of drops DR-1 to DR-n discharged from the drop discharge units 110-1 to **110-*n* to be uniform using the drop mass deviations inputted from the drop mass deviation measurement control part 205**.

In other words, drop discharge units that discharge drops having negative mass deviations are selected using the drop mass deviations inputted from the drop mass deviation measurement control part 205, and the selected drop discharge units are controlled such that the drops discharged from the selected drop discharge units have masses increased in proportion to the sizes of the negative mass deviations. In addition, drop discharge units that discharge drops having positive mass deviations are selected using the drop mass deviations inputted from the drop mass deviation measurement control part 205, and the selected drop discharge units are controlled such that the drops discharged from the selected drop discharge units have masses decreased in proportion to the sizes of the positive mass deviations.

Hereinafter, a drop mass deviation measuring method, of the drop mass deviation measuring apparatus, according to an embodiment of the present invention and a control method of a pattern forming system, using the drop mass deviation measuring apparatus, according to an embodiment of the present invention will be described with reference to the accompanying drawings. However, the focus will be placed on the control method of the pattern forming system.

Figure 5:
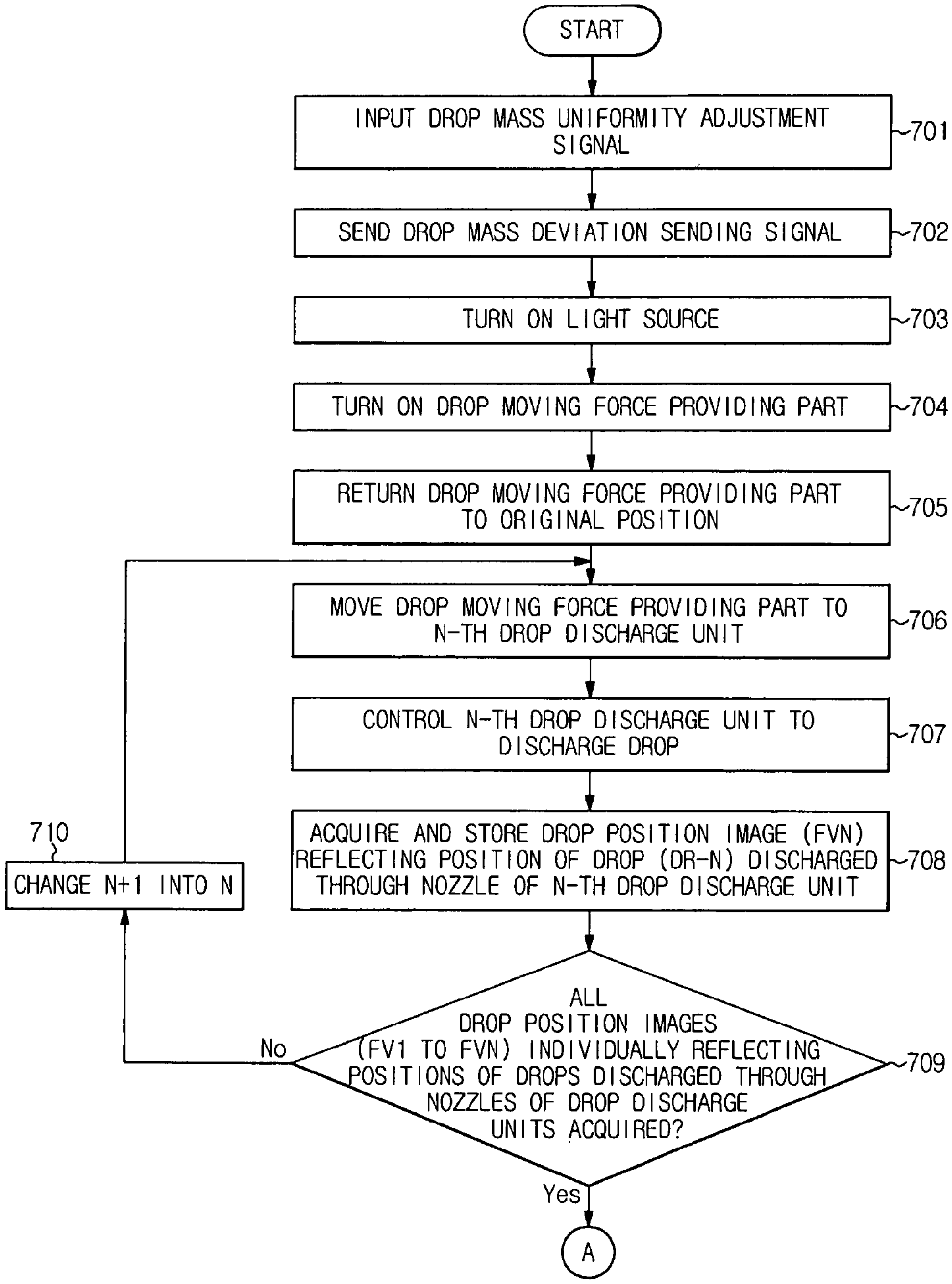
FIGS. 5 and 6 are flow charts illustrating a control method of a pattern forming system using drop mass deviation measuring apparatus according to an embodiment of the present invention.
Figure 6:
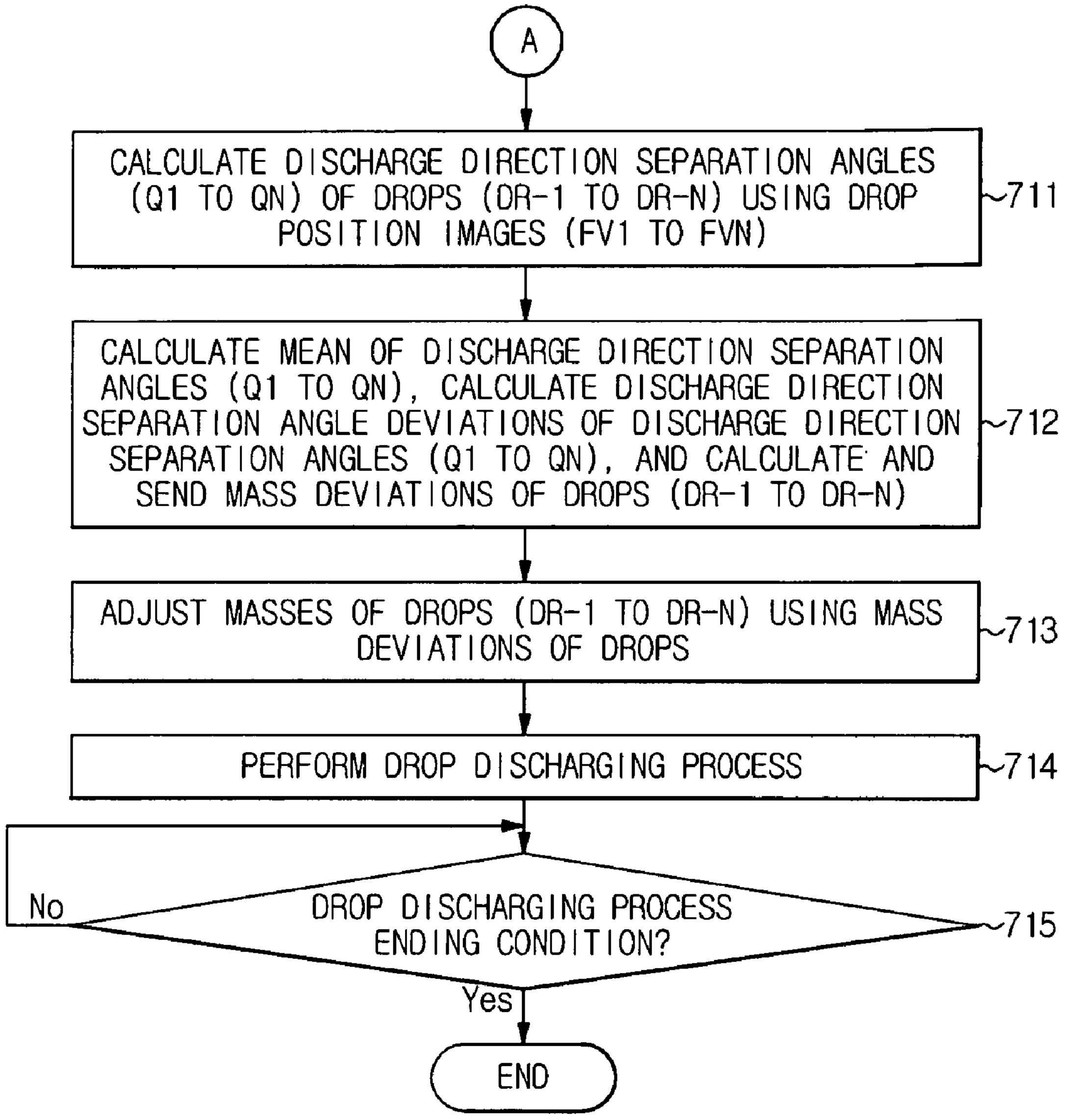
Figure 7:
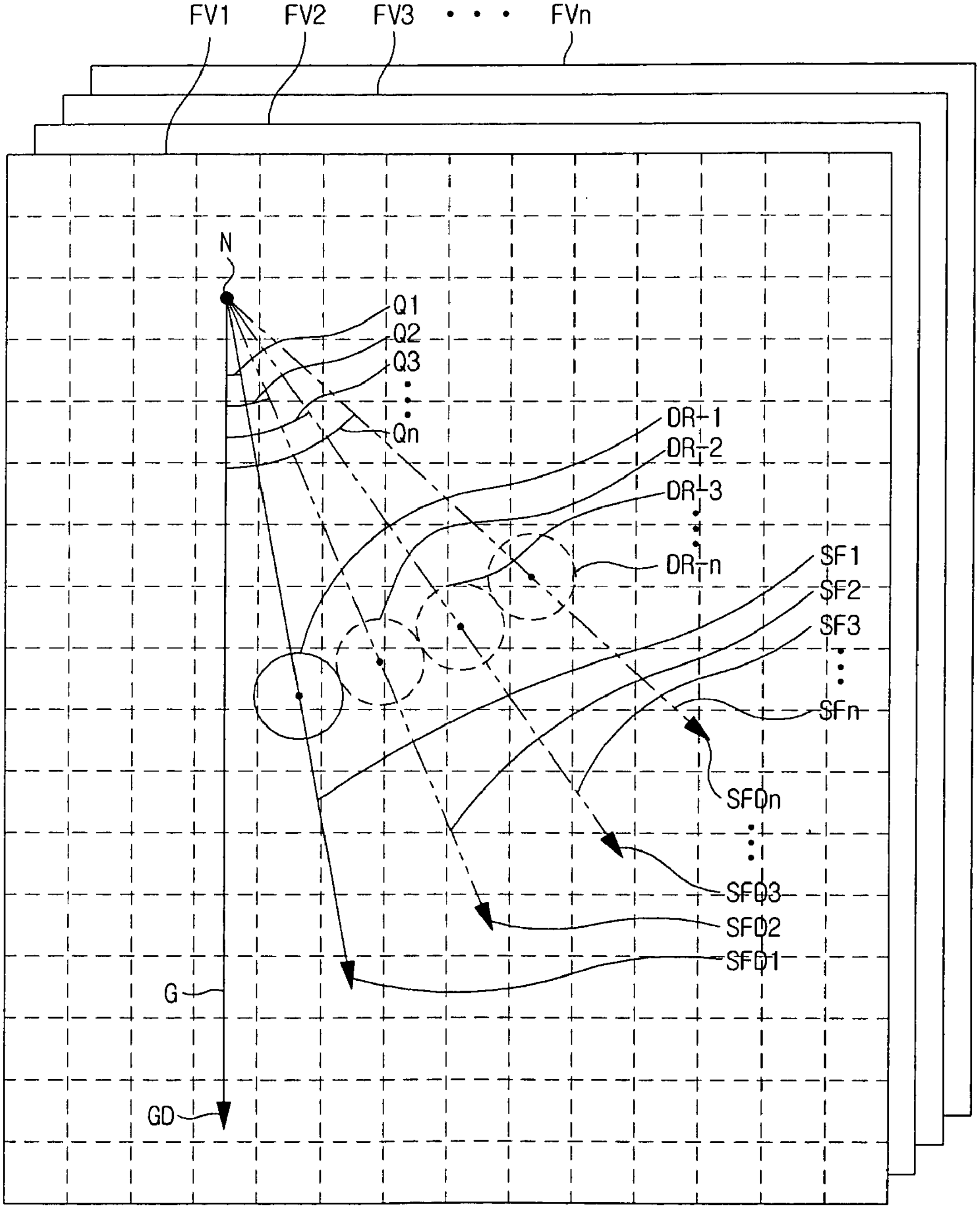
FIG. 7 is a view illustrating a drop mass deviation measuring method according to an embodiment of the present invention.

Referring to FIGS. 5 to 7, when a drop mass uniformity adjustment signal is inputted to the controller 300 (701), the controller 300 sends a drop mass deviation sending signal to the drop mass deviation measurement control part 205 (702).

As a result, the drop mass deviation measurement control part 205 controls the light source 220 to be turned on (703). Consequently, the light source 220 emits light toward the drop position photographing member 211.

Subsequently, the drop mass deviation measurement control part 205 controls the drop moving force providing part 230 to be turned on (704). Consequently, power is supplied to the anode plate 232 and the cathode plate 233 of the drop moving force providing part 230, with the result that an electric field E is created between the anode plate 232 and the cathode plate 233.

Subsequently, the drop mass deviation measurement control part 205 provides a control signal to the moving part 240 to control the moving part 240 to place the drop moving force providing part 230 at its original position (705). Here, the original position may be the end of the front FR or the rear RR of the nozzle row R.

Subsequently, the drop mass deviation measurement control part 205 performs a control operation to acquire drop position images FV1 to FVn individually reflecting the positions of drops DR-1 to DR-n discharged from the respective drop discharge units 110-1 to **110-*n*.**

In other words, the drop mass deviation measurement control part 205 provides a control signal to the moving part 240 to control the moving part 240 to move the drop moving force providing part 230 at a position corresponding to the n-th drop discharge unit **110-*n* such that a moving force is applied to the drop DR-n discharged through the drop discharge nozzle 114-*n* of the n-th drop discharge unit 110-*n* (706**).

Also, the drop mass deviation measurement control part 205 provides a control signal for the discharge of the n-th drop discharge unit **110-*n* to the controller 300. Consequently, the controller 300 performs a control operation to discharge a drop from the n-th drop discharge unit 110-*n* (707). As a result, an n-th drop DR-n is discharged through the nozzle 114-*n* of the n-th drop discharge unit 110-*n*.**

Subsequently, the drop mass deviation measurement control part 205 controls the drop position photographing member 211 to photograph the n-th drop DR-n, acquires a drop position image FVn reflecting the position of the n-th drop DR-n from the drop position photographing member 211, and stores the acquired image in the memory 260 (708).

Meanwhile, Operation 706 to Operation 708 are carried out first, and n is 1.

Subsequently, the drop mass deviation measurement control part 205 determines whether all drop position images FV1 to FVn individually reflecting the positions of drops DR-1 to DR-n discharged from the respective drop discharge units 110-1 to **110-*n* have been acquired (709**).

When it is determined that all the drop position images FV1 to FVn individually reflecting the positions of drops DR-1 to DR-n discharged from the respective drop discharge units 110-1 to **110-*n* have not been acquired, the drop mass deviation measurement control part 205 changes n+1 into n (710), and the procedure returns to Operation 706** where subsequent operations are carried out.

On the other hand, when it is determined that all the drop position images FV1 to FVn individually reflecting the positions of drops DR-1 to DR-n discharged from the respective drop discharge units 110-1 to **110-*n* have been acquired, the drop mass deviation measurement control part 205 calculates the moving directions SFD1 to SFDn of the drops DR-1 to DR-n using the drop position images FV1 to FVn and calculates the discharge direction separation angles Q1 to Qn of the drops DR-1 to DR-n, which are angles between the moving directions SFD1 to SFDn and the discharge directions GD of the drops DR-1 to DR-n (711**).

Subsequently, the drop mass deviation measurement control part 205 calculates the mass deviations of the drops DR-1 to DR-n discharged from the respective drop discharge units 110-1 to 110-*n* using the discharge direction separation angles Q1 to Qn of the drops DR-1 to DR-n and sends the calculated mass deviations of the drops DR-1 to DR-n to the controller 300 (712).

In other words, the drop mass deviation measurement control part 205 acquires the mean of the discharge direction separation angles Q1 to Qn of the drops DR-1 to DR-n and subtracts the mean of the discharge direction separation angles Q1 to Qn of the drops DR-1 to DR-n from the discharge direction separation angles Q1 to Qn of the drops DR-1 to DR-n to acquire the discharge direction separation angle deviations of the drops DR-1 to DR-n. After that, the discharge direction separation angle deviations of the drops DR-1 to DR-n are multiplied by a predetermined negative number to acquire the mass deviations of the drops DR-1 to DR-n.

Subsequently, the controller 300 receives the mass deviations of the drops DR-1 to DR-n, discharged from the respective drop discharge units 110-1 to 110-*n*, from the drop mass deviation measurement control part 205 and controls the masses of the drops DR-1 to DR-n discharged from the respective drop discharge units 110-1 to 110-*n* to be uniform (713).

In other words, the controller 300 selects drop discharge units that discharge drops having negative mass deviations, using the drop mass deviations inputted from the drop mass deviation measurement control part 205, and controls the selected drop discharge units such that the drops discharged from the selected drop discharge units have masses increased in proportion to the sizes of the negative mass deviations. Also, the controller 300 selects drop discharge units that discharge drops having positive mass deviations, using the drop mass deviations inputted from the drop mass deviation measurement control part 205, and controls the selected drop discharge units such that the drops discharged from the selected drop discharge units have masses decreased in proportion to the sizes of the positive mass deviations.

Subsequently, the controller 300 controls the pattern forming system 1 to perform a drop discharging process (714).

Finally, the controller 300 determines whether a drop discharging process ending condition is satisfied (715). When the drop discharging process ending condition is not satisfied, the controller 300 repeatedly determines whether the drop discharging process ending condition is satisfied. When the drop discharging process ending condition is satisfied, the controller 300 controls the drop discharging process to be ended.

As is apparent from the above description, the present invention acquires the mass deviations of the drops discharged from the respective drop discharge units in real time by the drop mass deviation measuring apparatus and the drop mass deviation measuring method and measuring the mass deviations of the drops discharged from the respective drop discharge units even when the drops have diameters requiring high precision.

Furthermore, the present invention reduces the time necessary to form patterns and forming patterns requiring high precision by the pattern forming system using the drop mass deviation measuring apparatus and the control method of the pattern forming system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A drop mass deviation measuring apparatus comprising:

a drop moving force providing part to provide moving forces to each of a plurality of drops discharged from a plurality of drop discharge units, wherein the moving forces have moving directions different from discharge directions of each of the plurality of drops;

a discharged drop position detection member to acquire drop position images individually reflecting a position of each of the plurality of drops; and a drop mass deviation measurement control part to calculate a drop discharge direction separation angle of each of the plurality of drops using the drop position images acquired by the discharged drop position detection member to measure mass deviations of each of the plurality of drops, wherein the drop mass deviation measurement control part subtracts a mean of the discharge direction separation angles of each of the plurality of drops from the discharge direction separation angles of each of the plurality of drops to acquire the discharge direction separation angle deviations of each of the plurality of drops and multiplies the discharge direction separation angle deviations of each of the plurality of drops by a predetermined negative number to acquire the mass deviations of each of the plurality of drops.

2. The drop mass deviation measuring apparatus according to claim 1, wherein the drop moving force providing part uses a Coulomb's force.

3. The drop mass deviation measuring apparatus according to claim 1, wherein the drop moving force providing part includes an anode plate and a cathode plate, the plurality of drops being located between the anode plate and the cathode plate.

4. The drop mass deviation measuring apparatus according to claim 1, wherein the drop mass deviation measurement control part sets angles between the moving directions in which discharge points of the plurality of drops and the positions of the drops are linked to each other at the drop position images and the discharge directions of the plurality of drops which are drop discharge direction separation angles of the drops.

5. A drop mass deviation measuring method of a drop mass deviation measuring apparatus, comprising:

acquiring drop position images individually reflecting positions of each of a plurality of drops sequentially discharged from a plurality of drop discharge units;

calculating a moving direction of each of the plurality of drops using the drop position images;

calculating a drop discharge direction separation angle of each of the plurality of drops, which is an angle between the moving direction and a discharge direction of each of the plurality of drops; and calculating a mass deviation of each of the plurality of drops using the drop discharge direction separation angles of each of the plurality of drops using a processor, wherein the operation of calculating the mass deviation of each of the plurality of drops includes subtracting a mean of the discharge direction separation angles of the plurality of drops from the discharge direction separation angles of each of the plurality of drops to acquire discharge direction separation angle deviations of each of the plurality of drops and multiplying the discharge direction separation angle deviation of each of the plurality of drops by a predetermined negative number to acquire the mass deviations of the plurality of drops.

6. The drop mass deviation measuring method according to claim 5, wherein the moving direction of each of the plurality of drops is a direction in which the discharge point of the drop and the position of the drop are linked to each other at the drop position image of the drop.

7. A pattern forming system using a drop mass deviation measuring apparatus, comprising:

a drop moving force providing part to provide moving forces to each of a plurality of drops discharged from a plurality of drop discharge units, wherein the moving forces have moving directions different from discharge directions of each of the plurality of drops;

a discharged drop position detection member to acquire drop position images individually reflecting the positions of each of the plurality of drops;

a drop mass deviation measurement control part to calculate a drop discharge direction separation angle of each of the drops using the drop position images acquired by the discharged drop position detection member to measure a mass deviation of each of the plurality of drops; and a controller to control a mass of each of the plurality of drops discharged from the drop discharge units to be uniform using the mass deviation of each of the plurality of drops measured by the drop mass deviation measurement control part, wherein the drop mass deviation measurement control part subtracts a mean of the discharge direction separation angles of each of the plurality of drops from the discharge direction separation angles of each of the plurality of drops to acquire the discharge direction separation angle deviations of each of the plurality of drops and multiplies the discharge direction separation anqle deviations of each of the plurality of drops by a predetermined negative number to acquire the mass deviations of each of the plurality of drops.

8. A control method of a pattern forming system using a drop mass deviation measuring apparatus, comprising:

acquiring drop position images individually reflecting a position of each of a plurality of drops sequentially discharged from a plurality of drop discharge units;

calculating a moving direction of each of the plurality of drops using the drop position images;

calculating a drop discharge direction separation angle of each of the plurality of drops, which is an angle between the moving direction and a discharge direction of each of the plurality of drops;

calculating a mass deviation of each of the plurality of drops using the drop discharge direction separation angle of each of the plurality of drops using a processor; and controlling a mass of each of the plurality of drops discharged from the drop discharge units to be uniform using the mass deviation of each of the plurality of drops, wherein the operation of controlling the mass of each of the plurality of drops includes selecting drop discharge units that discharge drops having negative mass deviations from the drop discharge units, controlling the drops discharged from the selected drop discharge units to have masses increased in proportion to sizes of the negative mass deviations, selecting drop discharge units that discharge drops having positive mass deviations from the drop discharge units, and controlling the drops discharged from the selected drop discharge units to have masses decreased in proportion to sizes of the positive mass deviations.

* * * * *

UNITED STATES PATENT AND TRADEMARK OFFICE

CERTIFICATE OF CORRECTION

PATENT NO. : 8,170,827 B2
APPLICATION NO. : 12/222602
DATED : May 1, 2012
INVENTOR(S) : Chong Uck Kim et al.

It is certified that error appears in the above-identified patent and that said Letters Patent is hereby corrected as shown below:

First Page Column 1 Item 75 (Inventors), Line 4, Delete “Eun Seon” and insert -- Eun Seop --, therefor.

First Page Column 2 (Abstract), Line 11, Delete “the a” and insert -- a --, therefor.

Column 11, Line 35, In Claim 7, delete “anqle” and insert -- angle --, therefor.

Signed and Sealed this
Seventeenth Day of July, 2012

David J. Kappos
*Director of the United States Patent and Trademark Office*